(12) United States Patent
Spurgeon et al.

(10) Patent No.: US 11,142,837 B2
(45) Date of Patent: Oct. 12, 2021

(54) ELECTROCATALYTIC MATERIALS FOR OXYGEN EVOLUTION OF FORMULA $A_{1-x}B_xO_{3-\delta}$

(71) Applicant: University of Louisville Research Foundation, Inc., Louisville, KY (US)

(72) Inventors: Joshua Spurgeon, Louisville, KY (US); Mahendra K. Sunkara, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 32 days.

(21) Appl. No.: 16/584,004

(22) Filed: Sep. 26, 2019

(65) Prior Publication Data

US 2020/0102661 A1 Apr. 2, 2020

Related U.S. Application Data

(60) Provisional application No. 62/738,357, filed on Sep. 28, 2018.

(51) Int. Cl.
*C25B 11/00* (2021.01)
*C25B 11/075* (2021.01)
*C25B 1/04* (2021.01)
*C01G 55/00* (2006.01)

(52) U.S. Cl.
CPC .......... *C25B 11/075* (2021.01); *C01G 55/004* (2013.01); *C25B 1/04* (2013.01)

(58) Field of Classification Search
CPC .. C01G 55/002; C01G 55/004; C01G 41/006; C01G 41/02; C01G 35/00; C01G 35/006; C01G 23/002; C01G 23/003; C01G 23/04
See application file for complete search history.

(56) References Cited

U.S. PATENT DOCUMENTS

2002/0107140 A1* 8/2002 Hampden-Smith .... B01J 35/002
502/185
2018/0320278 A1 11/2018 Kumta

OTHER PUBLICATIONS

Patel et al, J. Mater. Chem. A: Materials for Energy and Sustainability, 3(35), 18296-309. (Year: 2015).*

* cited by examiner

*Primary Examiner* — Steven J Bos
(74) *Attorney, Agent, or Firm* — W & C IP

(57) ABSTRACT

Electrocatalysts of formula $A_{1-x}B_xO_{3-\delta}$, wherein A=a metal with an acid-stable oxide and B=a platinum-group-metal (PGM), are provided, as are methods of making the electrocatalysts via rapid plasma oxidation, methods of using the electrocatalysts to catalyze e.g. oxygen evolution reactions (OERs), and devices comprising the electrocatalysts.

18 Claims, 6 Drawing Sheets

Figure 4A
Figure 4B
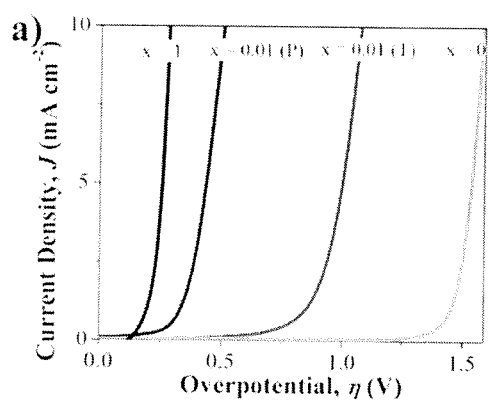
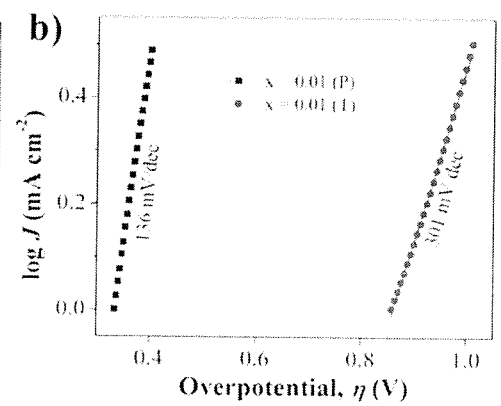
Figure 4C
Figure 4D

Figure 5A
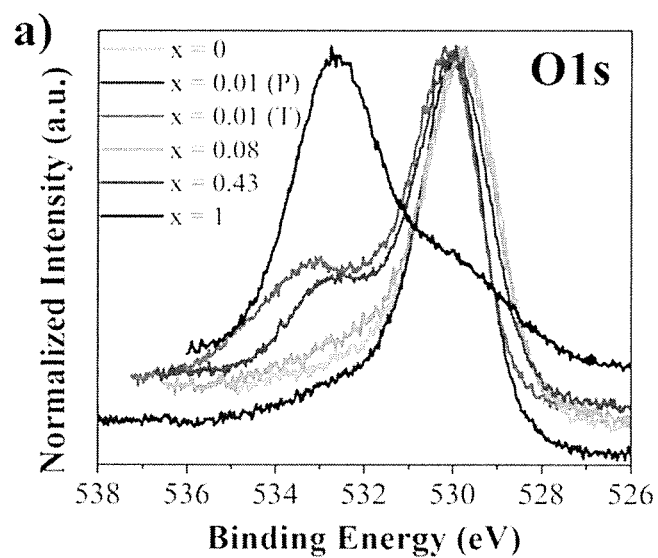
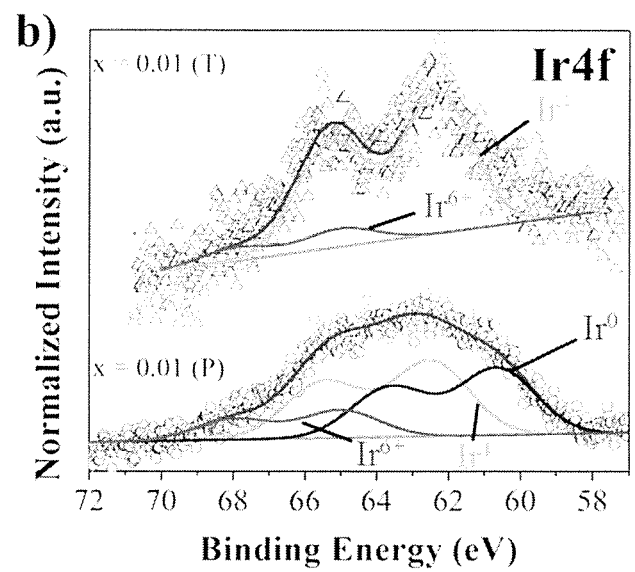
Figure 5B

Figure 6

|  | $x = 0.0(P)$ | $x = 0.01(T)$ | $x = 0.01(P)$ | $x = 0.08(P)$ | | $x = 0.43(P)$ | | |
|---|---|---|---|---|---|---|---|---|
| Phase | [1]WO$_3$ | WO$_3$ | WO$_3$ | WO$_3$ | [2]Ir | WO$_3$ | Ir | [3]IrO$_2$ |
| wt. fraction | 1.0000 | 1.0000 | 1.0000 | 0.97104 | 0.02896 | 0.63986 | 0.22686 | 0.13328 |
| Density(g/cm$^3$) | 7.260 | 7.180 | 7.259 | 7.258 | 22.537 | 7.262 | 22.512 | 11.661 |
| R$_{wp}$ | 0.092 | 0.0621 | 0.073 | 0.0688 | | 0.0734 | | |
| R$_p$ | 0.0674 | 0.0497 | 0.0568 | 0.0506 | | 0.0524 | | |
| R$_{Bragg}$ | 0.0496 | 0.0637 | 0.0597 | 0.0402 | | 0.1542 | | |
| $a$(Å) | 7.315(1) | 7.390(1) | 7.329(1) | 7.329(1) | 3.841(1) | 7.321(0) | 3.842(0) | 4.502(1) |
| $b$(Å) | 7.531(1) | 7.537(1) | 7.518(1) | 7.523(1) | 3.841(1) | 7.529(1) | 3.842086 | 4.502(1) |
| $c$(Å) | 7.701(1) | 7.703(1) | 7.698(1) | 7.697(1) | 3.841(1) | 7.695(1) | 3.842086 | 3.151(1) |
| α(°) | 90.21(1) | 89.38(2) | 89.65(1) | 89.74(1) | 90 | 89.68(1) | 90 | 90 |
| β(°) | 89.33(1) | 89.35(1) | 89.37(1) | 89.35(1) | 90 | 89.29(1) | 90 | 90 |
| γ(°) | 90.04(2) | 89.61(2) | 89.91(1) | 89.96(2) | 90 | 89.95(1) | 90 | 90 |
| Volume(Å$^3$) | 424.24(9) | 428.97(15) | 424.13(9) | 424.36(9) | 56.65(2) | 424.11(7) | 56.72 | 63.86(2) |
| GU | 0 | 36.49 | 782.2(44) | 570.6 | 0.00 | 36.49 | 36.49 | 36.49 |
| GV | -43.2 | -43.20 | -43.2(6) | -41.04 | -43.20 | -43.20 | -43.20 | -43.2 |
| GW | 14.26 | 14.26 | 36.21(6) | 14.26 | 14.26 | 14.26 | 14.26 | 14.26 |
| GP | 0 | 0.00 | 0.00 | 0 | 0.00 | 0.00 | 0.00 | 0 |
| LX | 23.47 | 38.94 | 18.38 | 19.01(3) | 27.11(2) | 13.14(2) | 8.58(2) | 0 |
| LY | 3.346 | 3.35 | 3.35 | 3.346 | 3.35 | 3.35 | 3.35 | 91.36(10) |
| S/L | 0.02555 | 0.03 | 0.03 | 0.02555 | 0.03 | 0.03 | 0.03 | 0.02555 |
| H/L | 0.04787 | 0.05 | 0.05 | 0.04787 | 0.05 | 0.05 | 0.05 | 0.05 |
| stec | 0 | 8.39 | 0.00 | 0.00 | 0.00 | 0.00 | 0.00 | 0.00 |
| L$_{23}$ | 0 | 0.00 | -0.27 | 0.00 | 0.00 | 0.00 | 0.00 | 0.00 |

[1]Triclinic phase (Space Group P$\bar{1}$), [2]Cubic phase (Space Group Fd$\bar{3}$m), [3]Tetragonal phase (Space Group P 42/m n m).

ELECTROCATALYTIC MATERIALS FOR OXYGEN EVOLUTION OF FORMULA $A_{1-x}B_xO_{3-\delta}$ This invention was made with government support under Grant No. 1355438 awarded by the National Science Foundation. The government has certain rights in the invention.

BACKGROUND OF THE INVENTION

Field of the Invention

The invention generally relates to electrocatalysts. In particular, the invention provides electrocatalysts of formula $A_{1-x}B_xO_{3-\delta}$, wherein A=a metal with an acid-stable oxide and B=a platinum-group-metal (PGM), and x ranges from 0.00000001 to 0.5, as well as methods of making the electrocatalysts via rapid plasma oxidation, and methods of using the electrocatalysts to catalyze, for example, oxygen evolution reactions (OERs).

Background of the Invention

Water-splitting from renewable electricity may be the most promising pathway for carbon-neutral, sustainable $H_2$ production.[1-3] The high operating voltage of commercial electrolyzers and corresponding energy loss are largely associated with the sluggish kinetics of water oxidation at the anode.[4,5] The oxygen evolution reaction (OER) (i.e., $2H_2O \rightarrow O_2 + 4H^+ + 4e^-$, in acid) is a kinetically demanding four-electron redox process with even the best catalysts having an overpotential of ~300 mV at 10 mA cm-2, a benchmark current density for use in solar water-splitting.[6,7] Proton exchange membrane (PEM) electrolyzers, which operate in deionized water with a strongly acidic ionomer membrane, offer a promising way to produce hydrogen of high-grade purity.[8,9] The advantages of PEM electrolyzers relative to alkaline-based electrolyzers include greater power density, higher efficiency at lower temperatures, and the availability of well-developed membranes with better ionic conductivity, durability, and tolerance to pressure differences.[10] Unfortunately, the high operating potential for the catalyst in the acidic membrane creates a corrosive environment in which only precious metal oxides have exhibited simultaneously high catalytic activity and stability.

Currently, nanoparticle iridium oxide/metallic blends are the main OER catalysts used in PEM electrolyzers.[11-14] Other acid-stable catalyst combinations of platinum group metals have been reported, but these metals are exceedingly rare.[15] Ir is ~10,000 times less abundant than Ni, Co, or W.[16] Even with affordable minimal catalyst loadings, it is unclear if production of these noble metals could be scaled up to meet global energy needs.

A number of effective earth-abundant OER catalysts, including NiFeOx, $Co_3O_4$, $MnO_2$, and others,[7,17,18] have overpotentials better than IrO, in alkaline conditions, but none are stable in strongly acidic electrolyte.[7,19] Among other stable oxides for acidic OER, PbOx has been studied extensively but to date only moderate to high overpotentials have been reported.[20-24] Recently, a F-doped $Cu_{1.5}Mn_{1.5}O_4$ has also shown promise as a water oxidation catalyst in acid.[25] Prior catalysis research has also tried to exploit multimetallic oxides with synergistic properties of the component elements, like the modest-overpotential acid-stable (Mn—Co—Ta—Sb)Ox.[26] Some efforts have focused on mixed noble and non-noble metal compositions to achieve acid-stable high activity with minimal noble metal content. Ru has been alloyed with Sn, Ir/Sn, and Ir/Ta to provide better acid stability.[27-29] IrSnSbOx has shown promise for OER catalysis in acid.[30] Ir has also been alloyed in the oxide form with Nb and Sn,[31] Mn,[32] and Ti[33,34] to make active acid-stable catalysts, but each of these studies required 10-40 mol % Ir to be effective.

Testing theoretical predictions of new alloys for OER catalysis requires production of a phase-pure composition, which has often been limited by experimental synthesis techniques. Conventional wet chemical methods such as solution-cast,[35] solvothermal,[36] Adams' fusion method,[37] or sol-gel[8] techniques rely on subsequent heating in air to thermally oxidize the material. The prolonged high-temperature oxidation leads to thermodynamic equilibrium, which can cause phase segregation into species other than the originally targeted composition.[39]

New electrocatalysts capable of catalyzing OER reactions, e.g. for use in PEM electrolyte systems, and methods of making such catalysts, are needed. In particular, acid stable electrocatalysts are needed.

SUMMARY OF THE INVENTION

Oxidation in an oxygen plasma is a rapid and scalable technique which has been demonstrated to lead to non-equilibrium solid solution phase growth capable of producing homogenous metastable phases.[39] The present disclosure describes the use of rapid oxygen plasma oxidation to produce mixed-metal oxide eletrocatalytic materials. The electrocatalytic materials comprise low levels of a noble metal (e.g. a platinum-group-metal, PGM) in combination with higher amounts of an abundant non-noble metal, e.g. a metal that forms an acid-stable oxide. The electrocatalytic materials exhibit excellent catalytic activity and low overpotentials e.g. in OER reactions, even under strongly acidic conditions.

It is an object of the invention to provide an electrocatalytic material with formula $A_{1-x}B_xO_{3-\delta}$, wherein: A=a metal with an acid-stable oxide, B=a platinum-group-metal (PGM), x ranges from 0.00000001 to 0.5, inclusive, and δ represents the number of vacancies in the crystal lattice. In some aspects, the B is ruthenium (Ru), rhodium (Rh), palladium (Pd), osmium (Os), iridium (Ir) or platinum (Pt), or a mixture of two or more of these. In some aspects, B is Ru or Ir. In other aspects, A is tungsten (W), tantalum (Ta) or titanium (Ti).

Also provided is a method of making an electrocatalytic material comprising i) positioning, on a substrate, a mixture comprising a liquid medium and i) a source of a metal with an acid-stable oxide and ii) a source of a platinum-group-metal (PGM); and exposing the mixture to an oxidizing non-equilibrium plasma for a period of time sufficient to form the electrocatalytic material. In some aspects, the PGM is ruthenium (Ru), rhodium (Rh), palladium (Pd), osmium (Os), iridium (Ir) or platinum (Pt), or a mixture of two or more of these. In further aspects, the PGM is Ir, Ru or Pt. In other aspects, the metal with an acid-stable oxide is tungsten (W), tantalum (Ta) or titanium (Ti). In additional aspects, the metal with an acid-stable oxide is W. In further aspects, the PGM is Ir. In yet further aspects, the oxidizing non-equilibrium plasma comprises an inert gas and oxygen. In some aspects, the inert gas is argon or helium. In additional aspects, the oxidizing non-equilibrium plasma further comprises hydrogen.

Also provided is a method of catalyzing an oxygen evolution reaction (OER), comprising contacting water with the electrocatalytic material with formula $A_{1-x}B_xO_{3-\delta}$, wherein: A=a metal with an acid-stable oxide, B=a platinum-group-metal (PGM). x ranges from 0.00000001 to 0.5, inclusive, and δ represents the number of vacancies in the crystal lattice; wherein the step of contacting is performed under conditions that permit catalysis of the OER by the electrocatalytic material. In some aspects, the conditions that permit catalysis include performing the step of contacting under strongly acidic conditions.

Also provided is a device comprising the electrocatalytic material with formula $A_{1-x}B_xO_{3-\delta}$, wherein: A=a metal with an acid-stable oxide, δ=a platinum-group-metal (PGM), x ranges from 0.00000001 to 0.5, inclusive, and δ represents the number of vacancies in the crystal lattice. In some aspects, the device is an electrolyzer.

Other features and advantages of the present invention will be set forth in the description of invention that follows, and in part will be apparent from the description or may be learned by practice of the invention. The invention will be realized and attained by the compositions and methods particularly pointed out in the written description and claims hereof.

BRIEF DESCRIPTION OF THE DRAWINGS

FIG. 4A-D. Plasma (P) vs. thermally (T) oxidized $W_{0.99}Ir_{3-\delta}$. A, OER catalyst current density vs. overpotential (J-η) behavior. Overpotential was determined relative to 1.23 V vs. RHE. B, Tafel plot of the OER catalyst data. C, XRD data comparing crystal structure and D, Raman data.

FIGS. 5A and B. XPS spectra of the catalysts for the A, O1s, and B, Ir4f peaks for plasma (P) and thermally (T) oxidized $W_{0.99}Ir_{0.01}O_{3-\delta}$.

FIG. 6. Structure parameters and R-factors of Rietveld refined samples. a, b, and c are the lattice constants. α, β and γ are the unit cell angles. GU, GV and GW are the Gaussian terms for U, V and W in the Cagliotti function, GP is the Gaussian crystallite size broadening. LX is the Lorentzian isotropic crystallite size broadening while LY is the isotropic strain broadening. S/L is the axial divergence S term, H/L is the axial divergence H term, stec represents Lorentzian anisotropic strain broadening, and L23 is represents the anisotropic Lorentzian microstrain.

DETAILED DESCRIPTION

Figures 1A, 1B, 1C:
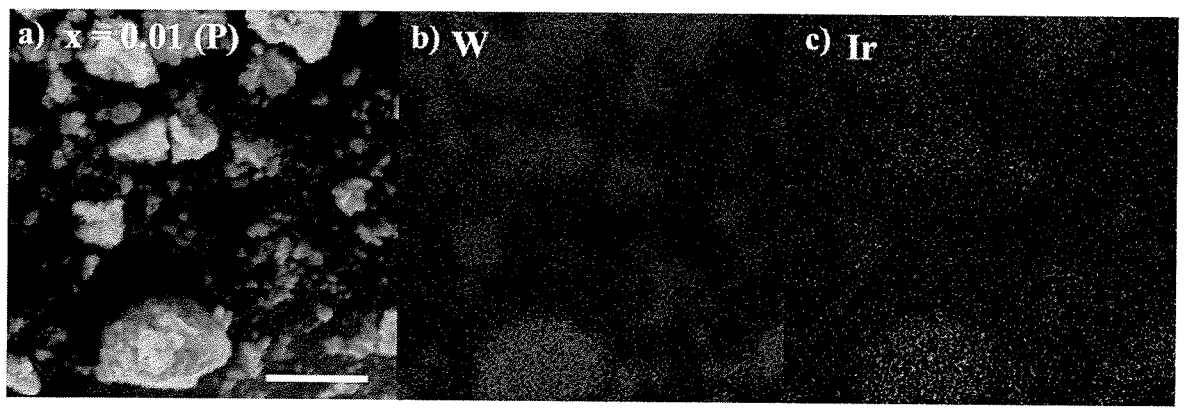
FIG. 1A-C. A, SEM image of the morphology and EDS elemental mapping of (B) W and (C) Ir for ball-milled, plasma-oxidized $W_{0.99}Ir_{0.01}O_{3-\delta}$. The scale bar in (A) is 5 µm.

The disclosure provides electrocatalysts with the formula $A_{1-x}B_xO_{3-\delta}$, wherein A=a metal with an acid-stable oxide; B=a platinum-group-metal (PGM); x ranges from 0.00000001 to 0.5, and δ represents vacancies in the crystal lattice. The catalysts, which are made using an oxidizing non-equilibrium plasma technique, are advantageously stable under strongly acidic conditions, and thus are ideal for use in devices such as electrolyzers for catalyzing e.g. "water splitting" reactions (OER).

Definitions:

By "highly acidic conditions" or "strongly acidic conditions" we mean reaction conditions that range in pH from about 4 or less e.g. about 3.0, 2.5, 2.0, 1.5, 1.0, 0.5, or 0 or less, i.e. the pH may be negative, such as about −1 or —2.

As used herein, noble metals include ruthenium (Ru), rhodium (Rh), palladium (Pd), silver (Ag), osmium (Os), iridium (Ir), platinum (Pt), and gold (Au). This category also includes mixtures or alloys of two or more of these metals.

As used herein, a platinum-group-metal (PGM) is one of subset of noble metals, namely ruthenium (Ru), rhodium (Rh), palladium (Pd), osmium (Os), iridium (Ir) or platinum (Pt). This category also includes mixtures or alloys of two or more of these metals. As used herein, the phrases "abundant metals with an acid-stable oxide", "earth abundant metals", and/or similar phrases include tungsten (W), tantalum (Ta), titanium (Ti), manganese (Mn), etc. This category also includes mixtures or alloys of two or more of these metals.

As will be readily recognized by those of skill in the art, the use of "δ" in a chemical formula of a material represents vacancies (a missing atom) in the crystalline lattice structure. Also, incomplete material oxidation is possible and a certain amount of crystal lattice oxygen vacancies may be present in the material. In some aspects, δ is dependent on the valence and amount of the cations in order to satisfy electroneutrality. In other words, the δ in a composition formula, e.g. $O_{3-\delta}$, signifies that the number of oxygen atoms could be less than 3, (i.e. the number of oxygen vacancy states is >0), depending on the oxidation state of the metals A and B.

Compounds

Exemplary electrolytic oxide compounds/compositions/materials disclosed herein have the general formula $A_{1-x}B_xO_{3-\delta}$ (Formula I) where A=a metal with an acid-stable oxide and B=a platinum-group-metal (PGM) In this formula, x ranges from about≥0.00000001 (i.e. close to zero) to about ≤0.50, including all decimal fractions in between in 0.00000001 increments, e.g. about 0.00000001, 0.00000002, 0.00000003, etc.; and/or in 10× increments, e.g. about 0.00000001, 0.00000010, 0.00000100, 0.00001000, 0.00010000, 0.00100000, 0.01000000 or 0.10000000; up to about 0.50. In this formula, δ is ≤3, e.g. 0, 1 or 2, and all decimal fractions ranging from 0 to 3, in 0.1 increments, such as 0.0. 0.1, 0.2, . . . 2.8, 2.9 or 3.0. Thus, the compounds advantageously comprise relatively low amounts of a rare and expensive element (for example, Ru or Ir) and higher amounts of an abundant and more affordable element (for example, W).

Examples of particular combinations of A and B metals include but are not limited to: W and Ir (e.g. as $W_{1-x}Ir_xO_{3-\delta}$); W and Ru (e.g. as $W_{1-x}Ru_xO_{3-\delta}$); Ti and Ir (e.g. as $Ti_{1-x}Ir_xO_{3-\delta}$), as well as various similar combinations using tantalum (Ta) as the A metal (e.g. A=Ta and B=Ir). Any combination of a metal with an acid-stable oxide (or alloy of a metal with an acid-stable oxide) and a platinum-group-metal (or alloy of one or more platinum-group-metals) may be present in the electrolytic compositions.

Methods

In general, the methods disclosed herein comprise steps of combining (forming a mixture or "reaction mixture" of) a source of a metal with an acid-stable oxide (A in Formula I) and a platinum-group-metal (B in Formula 1), positioning the mixture on a substrate and then exposing the mixture to an oxidizing non-equilibrium plasma. An exemplary, non-limiting catalytic material has the formula $W_{1-x}Ir_xO_{3-\delta}$ but the method steps and features discussed below can also be applied to other combinations of metals.

In some aspects, the A metal is W. Sources of W that can be used in the synthesis method include but are not limited to: ammonium paratungstate $[(NH_4)6W_{12}O_{39}.xH_2O]$, $NaWO_4$, W particles dissolved with hydrogen peroxide, etc. Any Ti or Ta salt that dissolves in water is potentially a viable precursor as long as another metal is not present in the salt.

In some aspects, the B metal is Ir. Sources of Ir can be used in the synthetic method include but are not limited to: iridium acetate, $Ir(CH_3COO)n$, iridium chloride, $IrCl_3$, iridium acetylacetonate, $Ir(C_5H_7O_2)_3$, etc. In other aspects, the B metal is Ru. Sources of Ru can be used in the synthesis method include but are not limited to: ruthenium chloride, $RuCl_3$, ruthenium acetylacetonate, $Ru(C_5H_7O_2)_3$, etc.

The mixture comprising the W and Ir sources is generally in a liquid medium, such as, for example, water, an alcohol such as ethanol or isopropanol, or other organic solvent (THF, DMF, acetonitrile), etc., or mixtures thereof. Any suitable medium/solvent can be used, as long as it does not cause breakdown of the oxidizing plasma during synthesis of the electrolytic material, does not introduce substantial impurities into the metal oxide, and does not affect the electrolytic material upon evaporation therefrom after formation.

The relative quantities of A and B in the solution to achieve a desired metal cation stoichiometry can vary from metal combination to metal combination. The amounts are generally calculated using standard chemistry/typical stoichiometry. For example, if a material with twice as many A atoms as B atoms is desired, twice as much A precursor on a molar basis is used, as long as the number of atoms of A and B in each precursor molecule is accounted for.

Generally exposure is performed e.g. by placing or positioning a suitable quantity of the reaction mixture on an impervious, temperature and oxidation robust substrate. Suitable substrates include but are not limited to: fluorine-doped tin-oxide (FTO) coated glass substrate, a thin ceramic, a Si wafer, etc. The resulting material is generally in the form of particles or a thin film, which is collected and redeposited on an electrode such as an electrolyzer electrode.

The quantity of reaction mixture that is reacted in a single synthesis can vary, depending on the scale of the synthesis, and can range from microliter quantities to milliliter or even larger quantities. Such syntheses may involve, for example, the use of an aerosol type process to send small droplets of precursor into the plasma, and then collection of the resulting particles.

The reaction mixture is then exposed to an oxidizing non-equilibrium plasma. The plasma generally comprises an inert, unreactive gas and oxygen. Examples of inert (noble) gases that may be used include but are not limited to: argon (Ar), helium (He), neon (Ne), etc. In some aspects, the inert gas is Ar or He. Sources of oxygen that may be used include but are not limited to air, pure $O_2$, etc.

In some aspects, the plasma includes at least one additional gas, for example, a reactive gas, e.g. to introduce more oxygen vacancy states. Examples of suitable reactive gases include but are not limited to hydrogen ($H_2$), etc. For example, about 0.1 to about 5%, such as about 0.1, 0.25, 0.5, 0.75, 1.0, 1.5, 2.0, 2.5, 3.0, 3.5, 4.0, 4.5 or 5.0% $H_2$ may be added. In some aspects, 1% $H_2$ is used.

The plasma power that is used depends on, for example, the excitation source type, gas used, and gas flow rates, etc. In some aspects, a plasma power ranging from about 250 W to about 750 W (e.g. 250, 300, 350, 400, 450, 500, 550, 600, 650, 700 or 750) is used. For example, a plasma power of 500 W may be selected.

The period of time for exposing the reaction mixture to the plasma is in the range of from about 5 seconds up to e.g. 60 minutes (e.g. up to about 10, 20, 30, 40, 50, or 60 minutes, although shorter times may be used. For example, times in the range of from about 5-90 seconds are also effective, e.g. about 5, 10, 20, 30, 40, 50, 60, 70, 80, or 90 seconds is also suitable. In some aspects, the time is 90 seconds. It is noted that longer times may facilitate establishing equilibrium, which minimizes the advantage of the plasma oxidation technique.

Generally, the medium or solvent that is used is rapidly evaporated away from the metal precursor, e.g. upon exposure to the plasma, by drying under ambient conditions, using a current of air, under vacuum, etc.

The materials of the disclosure may be synthesized as films or sheets and may be used as catalysts in these forms, i.e. as sheets or films. Alternatively, the films or sheets may be further processed to form particles, such as micro- or nanoparticles. The films or sheets may be transformed e.g. by crushing, processing in a blender, ball milling, etc. to achieve a o desired particle size. Films and particles comprising the disclosed electrolytic materials are also encompassed herein.

Reactions and Reaction Methods

Also provided are methods of catalyzing chemical reactions using the disclosed electrocatalytic materials. As an example, the electrocatalysts are used to catalyze OER reactions. Due to their acid stability, the electrocatalysts are advantageously used to catalyze OER reactions that are performed under acidic conditions, in particular strongly acidic conditions. Such OER reactions are typically performed by contacting water with the electrocatalytic material. The step of contacting is performed for a period of time sufficient to generate $H_2$ from the $H_2O$. Since the products of the reaction are generally removed immediately and a constant source of substrate water is provided continuously, the reaction can usually be conducted in a continuous manner for an indefinite period of time.

The present electrocatalysts exhibit favorable overpotentials. For example, when measured at 10 mA cm$^{-2}$ current density, the overpotential may be about 600 mV or less, such as 500, 400 or 300 mV or even less.

One product that is generated for the OER half-reaction as part of water-splitting is $H_2$ gas, and thus methods of generating $H_2$ gas (e.g. by contacting water with the electrocatalysts) are also encompassed. The $H_2$ gas may be used as a fuel (hydrogen fuel) and methods of generating hydrogen fuel (e.g. by contacting water with the electrocatalysts) are also encompassed. $H_2$ fuel generated in this manner may be used for any of a variety of purposes, for example, in internal combustion engines, in fuel cells, as a chemical reactant for ammonia formation or hydrogenation, etc.

The reactions that are catalyzed using the disclosed electrocatalysts are not limited to OER (water electrolysis). The OER is a half-reaction and can participate in any multipart reaction that use water oxidation on the anode. Examples include but are not limited to: hydrogen evolution, $CO_2$ reduction, $N_2$ reduction, etc.

Devices

The disclosed electrocatalytic materials may be incorporated into a wide variety of devices and/or may be a part of a device that employs electrocatalysts. Examples include but are not limited to: electrolyzers; Proton Exchange Membranes and the electrolyzers that use them as separators; devices in which the PEMs are used such as hydrogen fuel cells; in photocatalytic water splitting cells (e.g. which use artificial or natural (solar) light); devices which catalyze $CO_2$ or $N_2$ reduction. redox flow batteries, etc.

EXAMPLES

Example 1

W is an earth-abundant metal with an acid-stable oxide ($WO_3$)[40] but poor activity for oxygen evolution. A predicted phase diagram of the W—Ir—O system indicated that there are no stable mixed-metal oxide phases, and thus a mixed W—Ir oxide phase requires a non-equilibrium route such as plasma synthesis for production.
Experimental
Catalyst Synthesis Plasma oxidation of the liquid precursors was performed using an upstream (vertical plasma jet) atmospheric microwave plasma flame reactor as described in greater detail in previous work.[39] Chemically pure grades of ammonium paratungstate, $(NH_4)6W_{12}O_{39} \cdot xH_2O$ (Alfa Aesar, 99.9%) and iridium acetate, $Ir(CH_3COO)n$ (Alfa Aesar, Ir 48-54 wt %), were used as starting materials without further purification. Precursors were dissolved in 18 M Ω-cm DI water to a concentration of 0.1 M, and these solutions were mixed as needed to get the desired metal cation stoichiometry in mixed-metal oxide compositions. Subsequently, 0.1 mL of the mixed-metal precursor solution was drop-cast and spread onto 2 $cm^2$ of a fluorine-doped tin-oxide (FTO) coated glass substrate (Hartford Glass, Hartford, Conn.) which was then exposed to the upstream plasma jet with an input power of 500 W and a volumetric flow of 2 standard liters per minute (slpm) Ar, 11 slpm air, for 90 s to obtain a thin film of catalyst on FTO. The Ar gas was only needed for plasma ignition and was turned off after stable plasma was obtained. The plasma power of 500 W was chosen to prevent degradation of the FTO layer by keeping the substrate temperature <550° C. as determined by a pyrometer. Pure $Ir_2$ and high Ir-content mixed samples adhered well to the FTO substrate, but pure $WO_3$ and low Ir-content mixed samples displayed poor adhesion and flaked off of the substrate after a short period of electrochemical operation. Thus for stability tests, to separate chemical durability from adhesion/delamination issues, mixed-metal oxide catalyst films were scraped off and ball-milled (Desktop Vertical Ball Mill & Mixer with 4×1 Liter Nylon Tank-MSK-SFM-2) for ~16 h to obtain microparticles, which were bound to the electrode surface as described below. Thermally oxidized catalyst samples used the liquid precursor prepared in the same way on an FTO substrate, then placed in a furnace at 500° C. under an air atmosphere for 1 h.
Electrode Preparation FTO-glass and glassy carbon (GC) disks were used as working electrode substrates for the electrochemical measurements due to their high conductivity and poor electrocatalytic activity for OER. Prior to catalyst deposition, the FTO-glass substrates were cleaned by ultrasonication in an alkaline aqueous washing solution, DI water, ethanol, and then DI water again for 10 min/step. For FTO-glass electrodes, the metal precursor solution was directly cast on the substrate and exposed to the plasma jet to form a thin film of the mixed-metal oxide. For rotating disk electrode (RDE, Pine Instruments) measurements, 5 mm diameter GC disks were sonicated sequentially in pure DI water, acetone, 2-propanol, and then DI water again for 10 min/step. However, because glassy carbon substrates experienced significant degradation if exposed to the plasma jet, direct plasma oxidation of the catalysts on GC disks was not performed. Instead, an established drop-casting protocol for benchmarking nanoparticulate catalysts was used.[41] Powder-based inks for each catalyst were made using 3.8 mL DI water, 1.0 mL 2-propanol, 40 µL of 5% NAFION™ 117 solution (Sigma Aldrich), and 80 mg of the mixed-metal oxide powder prepared by ball-milling. The catalyst powders contained only the ball-milled mixed-metal oxide material prepared via plasma oxidation without any supportive conductive media such as carbon black. The inks were sonicated for 10 min to ensure a uniform particle dispersion. and then 10 pl of the ink was pipetted onto a polished glassy carbon disk, followed by drying in an oven under air at 60° C. for 10 min.
Material Characterization Electron micrographs of the morphology and EDS measurements of the $W_{1-x}Ir_xO_{3-\delta}$ catalysts were performed with an FEI Nova 600 and a TESCAN VEGA3 SB-EasyProbe scanning electron microscopes (SEM) at accelerating voltages of ~10-15 kV and 20 kV, respectively. High-resolution transmission electron microscope (HR-TEM) and energy dispersive X-ray spectroscopy (EDS) mapping measurements were conducted using either an FEI Tecnai F20 or JEOL 2010F microscope with an accelerating voltage of 200 kV.

To quantify the surface area of the mixed-metal oxide catalysts, Brunauer-Emmett-Teller (BET) analysis was performed with a Micromeritics TriStar 3000 porosimeter. Samples were carefully weighed and degassed before performing the measurements to remove any adsorbed contaminants from the surface and pores of the sample. Calculations for the BET surface area were done using the TriStar 3000 analysis program.

A Bruker D8 powder X-ray diffraction (XRD) system was used for crystal structure and phase analysis using non-monochromated Cu-Kα radiation produced by an X-ray tube operated at 40 kV and 40 mA. The sample XRD patterns were scanned between 20-80° at a scan speed of 4 seconds per step with a step size of 0.02°. Bruker EVA software and powder diffraction file (PDF) were used for phase identification. Crystallographic data analysis software GSAS-EXPGUI42 was employed to analyze and/or quantify the phases of catalyst materials in the Rietveld method for structure refinement. Atomic positions, cell parameters, background, scale-factors, and profile parameters were all refined. Additionally, a March-Dollase algorithm was employed for the correction of preferential orientation. Surface elemental analysis was performed using X-ray photoelectron spectroscopy (XPS) with a VG Scientific Multilab 3000 custom-built ultra-high vacuum system with Al-Kαradiation. Xps Peak 4.1 software was used for peak deconvolution and the XPS data analysis. Room temperature Raman measurements were performed in a backscatter configuration using an INVIA™ Renishaw micro-Raman spectrometer, equipped with a 50× objective lens, visible light optics, an 1800 mm-1 diffraction grating, and a HeNe laser producing 633 nm excitation wavelength. The silicon peak at 520 cm-1, measured from a standard silicon wafer, was used for the system calibration.
Electrochemical Measurements All measurements were performed in a three electrode setup using a Biologic SP-200 potentiostat. A Pt gauze counter electrode was separated from the main cell compartment with a glass frit and a saturated calomel electrode (SCE) served as the reference electrode. All potentials were converted and referred to the reversible hydrogen electrode (RHE) using the Nernst equation:[43]

$$E_{RHE}=E_{SCE}+0.241+0.059 \text{ pH} \qquad (1)$$

All electrochemical measurements were performed in aqueous 1 M $H_2SO_4$ at a scan rate of 20 mV s-1 with continuous stirring of the electrolyte during cyclic voltammetry (CV) and chronopotentiometry (CP) measurements. Catalyst current density vs. potential behavior was measured in each case for samples that were plasma oxidized directly on FTO substrates. The Ir-rich compositions on FTO/glass displayed highly stable behavior. However, plasma oxidation with the W precursor led to delamination issues under extended operation, so films were instead ball-milled to microparticles and bound to a GC disk for extended galvanostatic measurements.[41] The ball-milled samples were electrochemically characterized for stability with a similar setup and experimental conditions using a rotating disk electrode (RDE) with the GC disk as the working electrode rotated at 1600 rpm and by monitoring the potential of the working electrode at a constant 10 mA $cm^{-2}$. The particle binding method had limitations, however, and the NAFION™ binder film was observed to partially delaminate after extended testing. The unsteady performance of the $WO_3$ (x=0), which is known to be stable at pH 0 under anodic potentials,[40,44] was attributed to this issue. Potentiostatic electrochemical impedance spectroscopy (EIS) measurements were performed before every experiment to determine the uncompensated solution resistance, $R_u$, and the potentiostat subsequently compensated for 85% of $R_u$ during electrolysis. The typical electrochemical cell in these experiments had a resistance, $R_u$ ~10-20Ω in 1 M $H_2SO_4$. The current densities were determined relative to the geometric projected electrode area throughout this study.

Results and Discussion

Morphology and Phase Homogeneity

Plasma synthesis can produce variations in structure due to the rapid crystallization and non-equilibrium mixed phase formation, which could have potential consequences for the electrocatalytic behavior of the materials. Electron microscopy showed that there was strong structural variation in the morphology with the $W_{1-x}Ir_xO_{3-\delta}$ stoichiometry, from a sponge-like microporous structure at x=0.43 to a smoother layer at x=0.01 (not shown). The BET-measured specific surface area per catalyst mass (Table 1) consequently did not display a clear trend with Ir content either. EDS elemental mapping for mixed-metal oxide so catalysts showed that W and Ir were uniformly distributed throughout the majority of the sample. FIG. 1 shows the EDS map for $W_{0.99}Ir_{0.01}O_{3-\delta}$, in which the Ir appears to be evenly distributed with no segregation into concentrated regions. Uniformity of the metal distribution was mostly maintained throughout the phase for compositions with higher percentages of Ir as well, though EDS maps for 8% and 43% Ir samples displayed isolated regions of concentrated W or Ir (not shown).

TABLE 1

OER catalyst data.

| Catalyst [a] | $S_{BET}$ (m2 $g^{-1}$) [b] | Mass Activity (A $g^{-1}$) @ η = 0.3 V [c] |
|---|---|---|
| $WO_3$(P) | 3.27 | 0.0036 |
| $IrO_2$ (P) | 5.89 | 17.4 |
| $W_{0.57}Ir_{0.43}O_{3-\delta}$ (P) | 6.57 | 1.46 |
| $W_{0.92}Ir_{0.08}O_{3-\delta}$ (P) | 11.37 | 0.077 |

TABLE 1-continued

OER catalyst data.

| Catalyst [a] | $S_{BET}$ (m2 $g^{-1}$) [b] | Mass Activity (A $g^{-1}$) @ η = 0.3 V [c] |
|---|---|---|
| $W_{0.99}Ir_{0.01}O_{3-\delta}$ (P) | 3.68 | 0.220 |
| $W_{0.99}Ir_{0.01}O_{3-\delta}$ (P) | 8.66 | 0.014 |

[a] (P) Plasma oxidized, (T) Thermally oxidized.
[b] BET-measured specific surface area per mass of catalyst.
[c] Current per total mass of catalyst on the electrode determined at 0.3 V of overpotential, from as-deposited catalyst without optimization for deposition method or mass loading.

Figure 2:
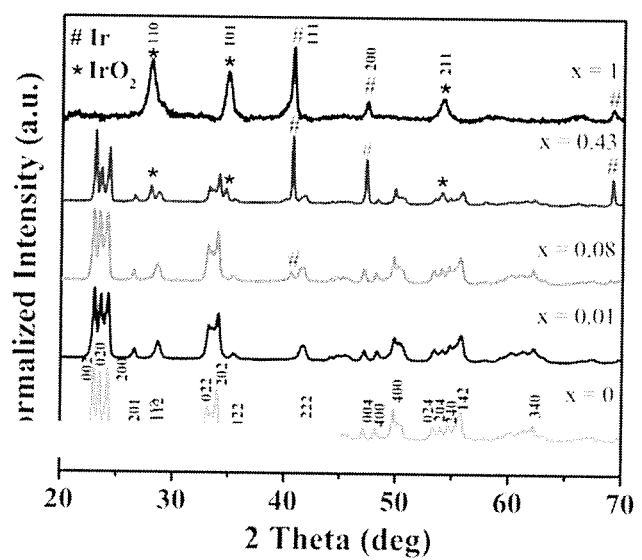
FIG. 2. XRD data for each type of plasma-synthesized catalyst.

For the samples investigated, the phase homogeneity depended strongly on the fraction of Ir in the composition. The XR data for the plasma-oxidized $W_{1-x}Ir_xO_{3-\delta}$ catalysts indicated that the mixed-metal oxides primarily maintained the triclinic structure of the $WO_3$, with characteristic peaks for $IrO_2$, observed at 28°, 35°, and 54° for the x=0.43 material (FIG. 2). This finding was supported for x=0.43 by Raman spectra showing a faint peak at ~560 cm-1 attributed to $IrO_2$ as well as the Ols XPS spectra showing a shoulder with a binding energy at 532.8 eV corresponding to $IrO_2$. Strong XRD peaks corresponding to metallic Ir were also present for x=0.43 at 41°, 48°, and 69° (FIG. 2). However, in decreasing the Ir content to x=0.08, there was no longer observable $IrO_2$ in the XRD or Ols XPS spectra, with only a smaller XRD peak for metallic Ir discernible at 41°. No diffraction peaks for $IrO_2$ or metallic Ir were observed for x=0.01, although such peaks may have been below the instrument detection limit. An XRD Rietveld analysis was employed for phase quantification to estimate the concentration of $IrO_2$ and metallic Ir observed in nominal compositions with 8% Ir and above. The results are shown in tabular form in FIG. 6.

HR-TEM images of the $W_{1-x}Ir_xO_{3-\delta}$ catalysts (not shown) were consistent with the XRD findings and indicated some Ir metal phase segregation. The Ir-rich regions were observable as dark patches in the TEM, which generally correlated with areas of locally enhanced polycrystallinity. This effect was most clearly displayed for $W_{0.57}Ir_{0.43}O_{3-\delta}$, with multiple dark patches and misaligned lattice fringes, whereas the plasma-oxidized $W_{0.99}Ir_{0.01}O_{3-\delta}$ particle was mostly uniform with highly parallel lattice fringes. For each $W_{1-x}Ir_xO_{3-\delta}$ catalyst, the lattice spacing for most of the bulk phase corresponded to a d-spacing of ~3.84 Å, consistent with the (002) planes for a $WO_3$ crystal. The TEM for the x=0.08 composition, however, showed a dark patch with a lattice d-spacing of 2.3 Å, which was indexed to Ir (111) and confirmed the presence of Ir metal inclusions. The plasma-oxidized $W_{1-x}Ir_xO_{3-\delta}$ structure thus generally consisted of evenly dispersed Ir throughout the $WO_3$ phase interspersed with small pockets of Ir-rich metal, as seen further when additional TEM and EDS mapping specifically targeted regions with Ir-rich clusters. In the resulting maps, the regions with high counts for Ir corresponded to areas with low counts for O, consistent with the presence of metallic Ir inclusions. This data suggests the bulk of each mixed-metal precursor is a phase homogeneous solid solution of $W_{1-x}Ir_xO_{3-\delta}$. However, there is a limit to how much Ir can be favorably incorporated into the $WO_3$ lattice, and for increasing amounts of Ir beyond 1%, much of it is segregated to Ir and $IrO_2$ nanoclusters. Electrochemical performance of plasma-oxidized $W_{1-x}Ir_xO_{3-\delta}$.

Figures 3A, 3B, 3C:
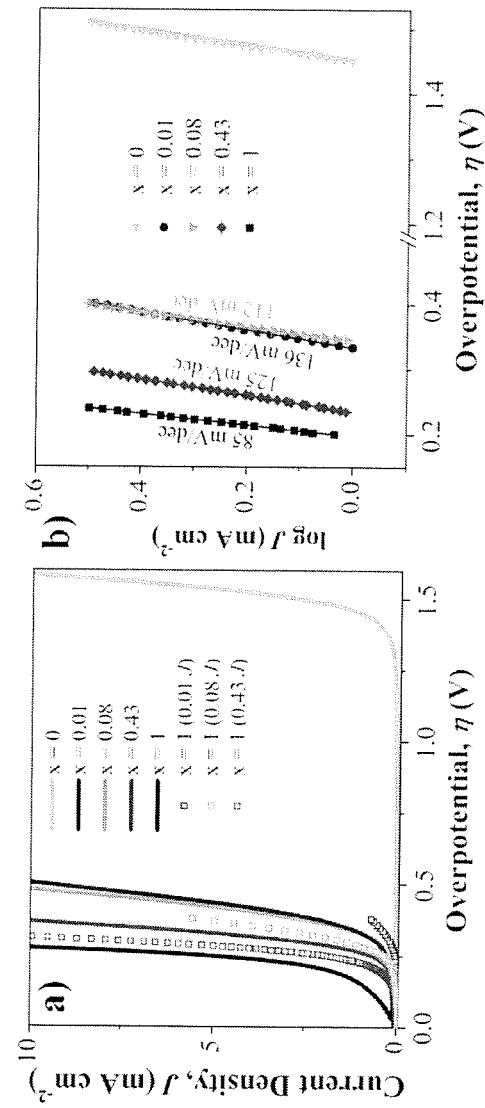
FIG. 3A-C. Electrochemical characterization for the plasma-synthesized $W_{1-x}Ir_xO_{3-\delta}$ catalysts in 1 M $H_2SO_4$. A, OER catalyst current density vs. overpotential (J-η) behavior, with solid lines for performance of catalysts by Ir content x, and data point squares for the current density of $IrO_2$ (x=1) scaled relative to the Ir content of the mixed-metal compositions. Overpotential was determined relative to 1.23 V vs. RHE; B, Tafel plot of the OER catalyst data; C, catalyst electrochemical stability for a constant current density of 10 mA $cm^{-2}$. The FTO glass substrate used for J-η measurements is included for comparison.

The plasma-oxidized $W_{1-x}Ir_xO_{3-\delta}$ catalyst compositions were made into electrodes and measured as anodes for electrochemical water oxidation in pH 0 aqueous electrolyte (see Experimental). FIG. 3A shows the OER current density versus overpotential (J-η) behavior, with the catalyst activity parameters reported in Table 2. The overpotential at 10 mA cm$^{-2}$ projected electrode area was reported in accordance with benchmarking protocol for electrocatalysts for a solar fuels application.[7] The plasma-oxidized IrO$_2$ (x=1) had an overpotential of 0.28 V. which puts it on par with literature values for state-of-the-art thermally oxidized IrO$_2$.[7, 35] On the other hand, WO$_3$ (x=0), devoid of active noble metals, had an overpotential of 1.58 V. Unsurprisingly therefore, higher Ir content mixed-metal catalyst compositions had better overall electrocatalytic performance (FIG. 3A) with lower overpotential (Table 2). Nevertheless, with only 1 at % of the W replaced with Ir atoms during plasma oxidation, the x=0.01 composition decreased the overpotential of WO$_3$ by more than 1 V to η=0.5 V. In fact, if the current density of the pure IrO$_2$ (x=1) electrocatalyst is multiplied by the corresponding x value of the other compositions, the resulting J-η behavior outperformed the respective W$_{1-x}$Ir$_x$O$_{3-\delta}$ catalyst for x=0.43 and 0.08 but underperformed for x=0.01 (FIG. 3A), perhaps indicating greater activity per Ir content for x=0.01.

(x=1) of 85 mV dec$^{-1}$ comparable but a bit higher than similar literature values. The plasma-synthesized W$_{1-x}$Ir$_x$O$_{3-\delta}$ compositions displayed a distinct increase in the Tafel slope from IrO$_2$, with values comparable to the slope observed for WO$_3$ (Table 2). This increased Tafel slope may indicate a shift in reaction mechanism as the lattice becomes dominated by the WO$_3$ crystal structure and the minimized presence of IrO$_2$.

The calculated TOF values based on Ir content indicated that only the x 32 0.01 composition had higher activity per Ir site than the pure IrO$_2$ (Table 2). From the materials characterization data discussed above, we thus speculate that the phase pure homogeneous W$_{1-x}$Ir$_x$O$_{3-\delta}$ solid solution surface had more active OER kinetics per Ir atom while segregation to IrO and IrO$_2$ phases, particularly as clusters within the catalyst bulk where access to the electrolyte would be hindered, led to a reduced performance on an Ir atom basis. It is also possible that the oxygen deficiency created by balancing charge with Ir$^{4+}$ in the W$_{1-x}$Ir$_x$O$_{3-\delta}$ phase leads to oxygen vacancies near the Ir site, with such vacancies reported to contribute to OER activity in metal oxides.

TABLE 2

Comparison of OER catalyst activity.

| Catalyst [a] | η @ 10 mA cm$^{-2}$ (V) [b] | Tafel Slope (mV dec$^{-1}$) | TOF$_{LB}$ (s$^{-1}$) [c] @ η = 0.3 V | TOF$_{UB}$ (s$^{-1}$) [d] @ η = 0.3 V | TOF$_{LB,Ir}$ (s$^{-1}$) [e] @ η = 0.3 V | TOF$_{UB,Ir}$ (s$^{-1}$) [f] @ η = 0.3 V |
|---|---|---|---|---|---|---|
| WO$_3$ (P) | 1.58 ± 0.012 | 116 | 2.2 × 10$^{-6}$ | 2.5 × 10$^{-4}$ | N/A | N/A |
| IrO$_2$ (P) | 0.28 ± 0.004 | 85 | 1.0 × 10$^{-2}$ | 4.7 × 10$^{-1}$ | 1.0 × 10$^{-2}$ | 4.7 × 10$^{-1}$ |
| W$_{0.57}$Ir$_{0.43}$O$_{3-\delta}$ (P) | 0.37 ± 0.002 | 125 | 8.7 × 10$^{-4}$ | 4.2 × 10$^{-2}$ | 2.0 × 10$^{-3}$ | 9.7 × 10$^{-2}$ |
| W$_{0.92}$Ir$_{0.08}$O$_{3-\delta}$ (P) | 0.48 ± 0.021 | 112 | 4.6 × 10$^{-5}$ | 1.5 × 10$^{-3}$ | 5.8 × 10$^{-4}$ | 1.8 × 10$^{-2}$ |
| W$_{0.99}$Ir$_{0.01}$O$_{3-\delta}$ (P) | 0.50 ± 0.026 | 136 | 1.3 × 10$^{-4}$ | 1.3 × 10$^{-2}$ | 1.3 × 10$^{-2}$ | 1.3 × 10$^{0}$ |
| W$_{0.99}$Ir$_{0.01}$O$_{3-\delta}$ (T) | 1.07 ± 0.016 | 301 | 8.2 × 10$^{-6}$ | 3.5 × 10$^{4}$ | 8.2 × 10$^{-4}$ | 3.5 × 10$^{-2}$ |

[a] (P) Plasma oxidized, (T) Thermally oxidized.
[b] Error determined by the standard deviation in measuring three different samples of each type.
[c] TOF based on all metal atoms of the catalyst.
[d] TOF based on metal atoms at the catalyst surface.
[e] TOF based on all Ir atoms of the catalyst.
[f] TOF based on Ir atoms at the catalyst surface.

Another relevant metric of catalyst activity is the turnover frequency (TOF, defined for OER as the molecules of O$_2$ generated per metal atom per second), which is included in Table 2 for a characteristic overpotential of η=0.3 V. With the uncertainty in the number of metal sites contributing to the reaction, both a lower and an upper bound TOF were calculated. The lower bound turnover frequency (TOFLB) assumed all metal sites throughout the bulk contribute to the reaction.[35] The upper bound turnover frequency (TOFUB), in contrast, was approximated assuming that only metal cations at the surface were active reaction sites. The resulting TOFLB for IrO$_2$ of 0.010$^{s-1}$ matched well with a similarly calculated TOF for solution-cast thin films of IrO$_x$,[35] with the calculated TOFUB of IrO$_2$ increasing to 0.47$^{s-1}$. As expected from FIG. 4A, the mixed-metal W$_{1-x}$Ir$_x$O$_{3-\delta}$ catalysts displayed lower TOF values on a per metal atom basis. However, if the activity is assumed to occur only at the Ir sites and the TOF values are corrected for the reduced Ir content in the mixed-metal oxides, the x=0.01 composition actually displayed greater lower and upper TOF values than pure IrO$_2$ (Table 2). FIG. 3B shows the Tafel slopes, with the slope for plasma-synthesized IrO$_2$ Furthermore, the promising activity with only 1% of the metal sites consisting of Ir was achieved without significant corrosion of the material under acidic oxidizing conditions, due to the use of W with its corrosion resistant oxide as the structural support material. The W$_{1-x}$Ir$_x$O$_{3-\delta}$ catalyst compositions were evaluated for durability by monitoring the potential during a galvanostatic measurement at 10 mA$^{cm-2}$, ensuring an equal charge passed per time for each material (FIG. 3C).7 Using this method, all W$_{1-x}$Ir$_x$O$_{3-\delta}$ compositions displayed steady catalytic performance over the time period, in contrast to established earth-abundant OER catalysts under acidic conditions.[6, 7]

Plasma vs. Thermally Oxidized W$_{0.99}$Ir$_{0.01}$O$_{3-\delta}$

To test if the preparation of the W$_{1-x}$Ir$_x$O$_{3-\delta}$ via plasma oxidation (P) had a significant effect on the catalyst behavior, the x=0.01 composition was compared to a material of equivalent stoichiometry prepared with the same precursors via thermal oxidation (T). Compared to plasma-oxidized material, the thermally oxidized 1% Ir catalyst showed a rougher microparticulate structure. HR-TEM analysis showed larger grain size and higher crystallinity for the plasma-oxidized material compared to the thermally oxidized sample, which exhibited strong contrast variations due to nanoscale polycrystallinity and voids. This structural difference is most clearly displayed in the STEM images, in which x=0.01 (P) particulates showed crystal grains of >150 nm while x=0.01 (T) particulates had grains <50 nm and displayed nanoscopic roughness and porosity.

FIG. 4 shows the electrochemical and materials characterization comparison between $W_{0.99}Ir_{0.01}O_{3-\delta}$ fabricated by plasma vs. thermal oxidation. Most notably, the same nominal $W_{0.99}Ir_{0.01}O_{3-\delta}$ composition displayed strikingly different electrocatalytic behavior depending on the oxidation method. Thermally oxidized material led to an overpotential of 1.07 V with a high Tafel slope of 301 mV dec$^{-1}$, compared to 0.50 V and a Tafel slope of 136 mV dec$^{-1}$ when plasma oxidized. The exact structural and chemical differences which lead to strongly enhanced OER activity in plasma relative to thermally oxidized material is somewhat unclear. XRD characterization of the x=0.01 (T) composition was comparable to the x=0.01 (P), with all the peaks indexed to the $WO_3$ phase without any resolvable $IrO_2$ or Ir peaks within the detection limit (FIG. 4C). Similarly, Raman spectra for both materials displayed the characteristic $WO_3$ peaks without the corresponding $IrO_2$ peaks (FIG. 4D). However, for both x=0.01 samples there was an additional Raman band peaking at 960 cm-1 not present in either $WO_3$ or $IrO_2$, which the literature generally attributes to the vs (W═O terminal) symmetric stretching mode.[46,47] This band was present for all the mixed-metal $W_{1-x}Ir_xO_{3-\delta}$ materials, and similar Raman features have been reported for numerous metal heteropolyoxo tungstate species.[47] This Raman band at ~960 cm$^{-1}$ thus reflects distortion among the tungsten oxide framework and further supports the presence of an iridium polytungstate phase. Also, the noticeable broadening of the Raman bands of the thermal sample relative to the plasma sample has been correlated to greater nanocrystallinity,[48] consistent with the observable nanocrystal domains in the HR-TEM for the x=0.01 (T).

XPS was used to probe the catalyst surface chemical bonding environment, and FIG. 5 shows the key data with normalized intensity for the ease of peak position comparison. Detailed XPS fitting for the various catalyst types were performed. For the O1s orbital, the main peaks at 530 eV and 532.8 eV were attributed to $O_{2-}$ in the $WO_3$ lattice and $IrO_2$ lattice, respectively. At a high concentration of Ir (x=0.43), a distinct shoulder was present at ~533 eV, consistent with the presence of $IrO_2$ as confirmed by XRD. Although this shoulder was greatly reduced for plasma-oxidized compositions of x=0.08 and 0.01, it was clearly present for the thermally oxidized x=0.01 sample. Because no $IrO_2$ peaks were discernible in the XRD for the x=0.01 (T) catalyst (FIG. 4C), this phase was either below the XRD detectable limit or restricted to the surface region probed by the XPS. However, no equivalent $IrO_2$ O1s peak was present for the x=0.01 (P), indicating that surface primarily maintained the metastable $W_{1-x}Ir_xO_{3-\delta}$ phase. Spectra for the W4f doublet peaks were comparable for all the catalysts with the W4f7/2 peak at 35.3 eV, close to literature values for $W^{6+}$ in $WO_3$.[49, 50] The Ir4f peaks, in contrast, displayed noticeably different XPS spectra between plasma and thermally oxidized $W_{0.99}Ir_{0.01}O_{3-\delta}$ (FIG. 5B). The Ir4f doublet peak for the x=0.01 (T) material was well-fit primarily by a single $Ir^{4+}$ peak, while the x=0.01 (P) Ir4f signal required both $Ir^{4+}$ and a lower binding energy peak to properly fit. The identity of this additional peak could possibly be attributed to either Ir in the mixed-metal polytungstate phase or to trace metallic Ir segregated to the particle surface.

Without being bound by theory, it is believed that the structure-function relationship permits dramatic enhancement in the OER catalysis of the plasma-synthesized compound relative to the thermally synthesized compound, and the materials characterization data highlights the physical differences between these forms of $W_{0.99}Ir_{0.01}O_{3-\delta}$ which are likely responsible. Morphologically, the Raman and electron microscopy data indicated that the thermal material consisted of rougher particles with nanocrystalline grains and porosity, in comparison to the smoother plasma material with larger crystal grains. Chemically, although both materials displayed a mixed iridium polytungstate phase of similar crystal structure to $WO_3$, XPS data indicated that the thermally oxidized catalyst had more segregated $IrO_2$ domains. Taken together, these observations suggest that the smooth crystalline faces of the metastable $W_{0.99}Ir_{0.01}O_{3-\delta}$ had greater kinetic activity for water oxidation in acid. A more well-developed study focused on theoretically modeling OER at the $W_{1-x}Ir_xO_{3-\delta}$ surface, with crystal models informed by the data reported here, would provide greater insight into how the plasma-synthesized material alters the water oxidation mechanism.

The observed 570 mV difference in the benchmarked overpotential between a plasma vs. thermally oxidized catalyst of the same composition clearly displays the effect that the non-equilibrium reaction and crystallization process can have on a mixed-metal oxide material. Several ambitious research efforts have used combinatorial synthesis and characterization methods to explore the elemental parameter space in search of novel active materials for OER catalysis, with most relying on thermal oxidation to convert the precursors to mixed-metal oxides.[15, 51, 52] The plasma vs. thermal oxidation catalyst results herein indicate that such combinatorial efforts could be in danger of bypassing promising materials which may require a metastable phase for high activity.

Conclusions

By synergistically combining Ir with W, a mixed-metal oxide phase with noble metal content as low as 1% had durable anodic performance in acid with promising OER catalysis. The critical electrocatalytic properties were enabled by oxidation in a non-equilibrium plasma environment, with traditional thermal oxidation instead resulting in significantly inferior OER activity. The characterization indicated that the plasma method led to better catalysis by promoting larger crystals of the homogenous iridium polytungstate phase. This is useful for acidic water electrolysis. Additionally, the results demonstrate that the wide composition space of thermally processed oxides which have failed to show noteworthy catalysis may yield different outcomes and new active compositions of metastable phases when processed instead via non-equilibrium plasma oxidation.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

REFERENCES

1. M. Conte, et al, Journal of Power Sources, 2001, 100, 171-187.
2. M. A. Rosen and D. S. Scott, International Journal of Hydrogen Energy, 1998, 23, 653-659.

3. J. A. Turner, Science, 2004, 305, 972-974.
4. R. Cao, et al, Energy & Environmental Science, 2012, 5, 8134-8157.
5. S. Park, et al, Energy & Environmental Science, 2012, 5, 9331-9344.
6. C. C. L. McCrory, et al, Journal of the American Chemical Society, 2013, 135, 16977-16987.
7. C. C. L. McCrory, et al, J. Am. Chem. Soc., 2015, 137, 4347-4357.
8. E. Mayousse, et al, International Journal of Hydrogen Energy, 2011, 36, 10474-10481.
9. S. Siracusano, et al, International Journal of Hydrogen Energy, 2011, 36, 3333-3339.
10. X. Wu, et al, International Journal of Hydrogen Energy, 2011, 36, 14796-14804.
11. P. Millet, ECS Trans., 2016, 75, 1073-1079.
12. N. Danilovic, et al, ECS Trans., 2016, 75, 395-402.
13. S. Zhao, et al, ECS Trans., 2015, 69, 877-881.
14. J. M. Spurgeon and N. S. Lewis, Energy Environ. Sci., 2011, 4, 2993-2998.
15. D. Seley, et al, ACS Comb. Sci., 2013, 15, 82-89.
16. G. B. Haxel, et al, US Geological Survey, 2002.
17. E. Fabbri, et al, Catalysis Science & Technology, 2014, 4, 3800-3821.
18. S. Trasatti, Electrochim. Acta, 1984, 29, 1503-1512.
19. A. Minguzzi, et al, Chem. Sci., 2012, 3, 217-229.
20. S. Abaci, et al, Electrochemistry Communications, 2005, 7, 328-332.
21. R. Amadelli, et al, Electrochim. Acta, 1999, 45, 713-720.
22. R. Bertoncello, et al. Journal of Electroanalytical Chemistry, 2000, 492, 145-149.
23. J. Cao, et al, Electrochimica Acta, 2007, 52, 7870-7876.
24. S. Cattarin, et al, Electrochimica Acta, 2001, 46, 4229-4234.
25. P. P. Patel, et al, Scientific Reports, 2016, 6.
26. A. Shinde, et al, Electrocatalysis, 2015, 6, 229-236.
27. J. Gaudet, et al, Chemistry of Materials, 2005, 17, 1570-1579.
28. A. T. Marshall, et al, International Journal of Hydrogen Energy, 2007, 32, 2320-2324.
29. R. S. et al, Journal of The Electrochemical Society, 1981, 128, 1900-1904.
30. N. J. Perez-Viramontes, et al, J. Appl. Electrochem., 2015, 45, 1165-1173.
31. K. Kadakia, et al, Int. J. Hydrogen Energy, 2012, 37, 3001-3013.
32. W. Sun, et al, Journal of Materials Chemistry A, 2016, 4, 12561-12570.
33. E. Oakton, et al, New J. Chem., 2016, 40, 1834-1838.
34. E. Oakton et al, ACS Catal., 2017, 7, 2346-23525.
35. L. Trotochaud, et al, J. Am. Chem. Soc., 2012, 134, 17253-17261.
36. K. Fominykh, et al, ACS Nano, 2015, 9, 5180-5188.
37. J. B. Cheng, et al, Int. J. Hydrogen Energy, 2009, 34, 6609-6624.
38. M. De Koninck, et al. Electrochem. Soc., 2006, 153, A2103-A2110.
39. B. P. Ajayi, et al, J. Mater. Res., 2016, 31, 1596-1607.
40. M. Pourbaix, Atlas of Electrochemical Equilibria in Aqueous Solution, Pergamon Press, Oxford, 1966.
41. S. Jung, et al, Journal of Materials Chemistry A, 2016, 4, 3068-3076.
42. A. C. Larson and R. B. Von Dreele, General Structure Analysis System. LANSCE, MS-H805, Los Alamos, New Mexico, 1994.
43. A. J. Bard and L. R. Faulkner, Electrochemical Methods: Fundamentals and Applications, John Wiley & Sons, 2001.
44. J. M. Spurgeon, et al, PCCP, 2014, 16, 3623-3631.
45. J. T. Mefford, et al, Nat. Commun., 2016, 7.
46. T. Kubo and Y. Nishikitani, J. Electrochem. Soc., 1998, 145, 1729-1734.
47. E. I. Ross-Medgaarden and I. E. Wachs, J. Phys. Chem. C, 2007, 111, 15089-15099.
48. Z. D. Xiao, et al, Nanotechnology, 2005, 16, 2647-2650.
49. K. T. Ng and D. M. Hercules, J. Phys. Chem., 1976, 80, 2094-2102.
50. F. Kerkhof, J. A et al. Electron. Spectrosc. Relat. Phenom., 1978, 14, 453-466.
51. M. Woodhouse and B. A. Parkinson, Chem. Soc. Rev., 2009, 38, 197-210.
52. J. M. Gregoire, et al, Rev. Sci. Instrum., 2013, 84.

We claim:

1. An electrocatalytic material with formula $A_{1-x}B_xO_{3-\delta}$, wherein
   A = a metal with an acid-stable oxide,
   B = a platinum-group-metal (PGM),
   x ranges from 0.00000001 to 0.5, inclusive, and
   δ represents the number of vacancies in the crystal lattice.

2. The electrocatalytic material of claim 1, wherein B is ruthenium (Ru), rhodium (Rh), palladium (Pd), osmium (Os), iridium (Ir), platinum (Pt), or a mixture of two or more of these.

3. The electrocatalytic material of claim 2, wherein B is Ru or Ir.

4. The electrocatalytic material of claim 1, wherein A is tungsten (W), tantalum (Ta) or titanium (Ti).

5. A method of making an electrocatalytic material of claim 1, comprising
   positioning, on a substrate, a mixture comprising a liquid medium and i) a source of a metal with an acid-stable oxide and ii) a source of a platinum-group-metal (PGM); and
   exposing the mixture to an oxidizing non-equilibrium plasma for a period of time sufficient to form the electrocatalytic material.

6. The method of claim 5, wherein the PGM is ruthenium (Ru), rhodium (Rh), palladium (Pd), osmium (Os), iridium (Ir), platinum (Pt), or a mixture of two or more of these.

7. The method of claim 6, wherein the PGM is Ir, Ru or Pt.

8. The method of claim 5, wherein the metal with an acid-stable oxide is tungsten (W), tantalum (Ta) or titanium (Ti).

9. The method of claim 8, wherein the metal with an acid-stable oxide is W.

10. The method of claim 7, wherein the PGM is Ir.

11. The method of claim 5, wherein the oxidizing non-equilibrium plasma comprises an inert gas and oxygen.

12. The method of claim 9, wherein the inert gas is argon or helium.

13. The method of claim 11, wherein the oxidizing non-equilibrium plasma further comprises hydrogen.

14. A method of catalyzing an oxygen evolution reaction (OER), comprising
   contacting water with the electrocatalytic material of claim 1,
   wherein the step of contacting is performed under conditions that permit catalysis of the OER by the electrocatalytic material.

15. The method of claim 14, wherein the conditions that permit catalysis include performing the step of contacting under strongly acidic conditions.

16. A device comprising the electrocatalytic material of claim 1.

17. The device of claim 15, which is an electrolyzer.

18. The electrocatalytic material of claim 1 wherein x ranges from 0.00000001 to 0.01.

* * * * *